(12) United States Patent
Goering et al.

(10) Patent No.: US 6,421,992 B1
(45) Date of Patent: Jul. 23, 2002

(54) COTTON HARVESTER WITH TWO BALE CHAMBERS

(75) Inventors: Kevin Jacob Goering, Cambridge; Virgil Dean Haverdink, Ankeny, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/711,442

(22) Filed: Nov. 13, 2000

(51) Int. Cl.[7] .......................... A01D 46/08; A01D 61/00
(52) U.S. Cl. ........................ 56/28; 56/16.4 B; 56/341; 56/432
(58) Field of Search ................ 56/341, 343, 16.4 R, 56/16.4 B, 432, 28; 100/88, 89, 82, 87, 7, 40, 138, 151, 152

(56) References Cited

U.S. PATENT DOCUMENTS

| | | | |
|---|---|---|---|
| 3,020,830 A | * | 2/1962 | Harrington .................... 56/341 |
| 3,412,532 A | * | 11/1968 | Nickla ......................... 56/13.3 |
| 3,665,690 A | | 5/1972 | Wenger ........................ 56/341 |
| 4,548,131 A | * | 10/1985 | Williams ........................ 100/1 |
| 4,553,378 A | * | 11/1985 | Fachini et al. ................. 56/341 |
| 4,651,512 A | | 3/1987 | van der Lely ................. 56/341 |
| 4,796,417 A | | 1/1989 | van der Lely ................. 56/341 |
| 6,032,446 A | | 3/2000 | Gola et al. ..................... 56/341 |
| 6,205,756 B1 | * | 3/2001 | Orsborn et al. ................ 56/30 |
| 6,263,650 B1 | * | 7/2001 | Deutsch et al. ........... 56/16.4 R |

* cited by examiner

*Primary Examiner*—Robert E. Pezzuto
*Assistant Examiner*—Nathan Mammen

(57) ABSTRACT

An on-board cotton harvester baling system includes first and second balers mounted side-by-side on the frame of a cotton harvester adjacent a single accumulator that extends generally the width of the balers. One of two sets of metering rollers located at the bottom of the accumulator is selectively activated to feed cotton to the first baler. A reversible auger extending the width of the accumulator moves cotton withing the accumulator towards the activated set of metering rolls to assure a continued supply of material for the operating baler. When the first bale is fully formed, the opposite set of metering rolls and the second baler are activated, and the auger is reversed. The completed bale can be easily unloaded while the second baler operates so that cotton harvester operation.

20 Claims, 3 Drawing Sheets

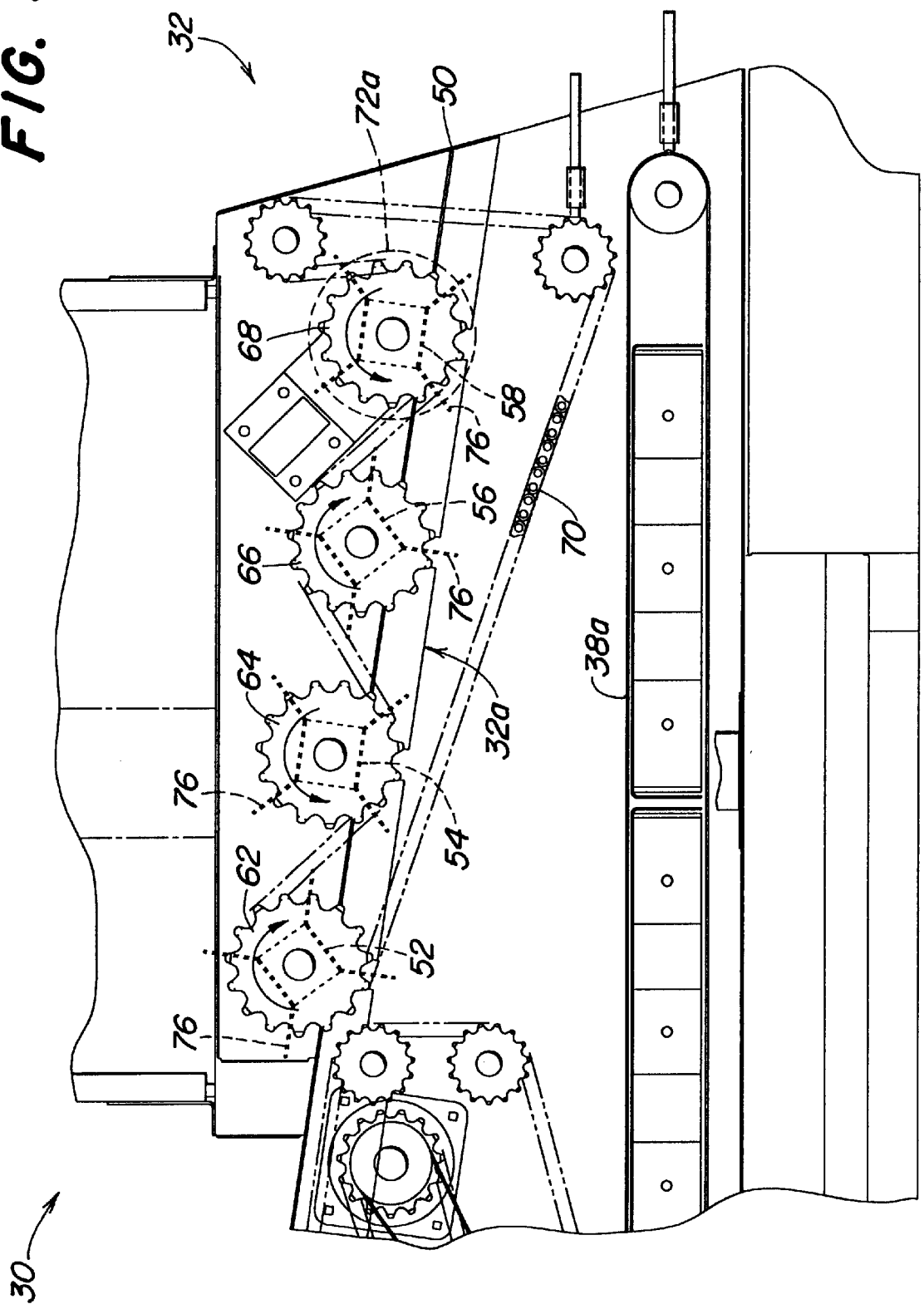

COTTON HARVESTER WITH TWO BALE CHAMBERS

BACKGROUND OF THE INVENTION

1) Field of the Invention

The present invention relates generally to cotton harvesting implements and, more specifically, to a baling arrangement for a cotton harvester.

2) Related Art

Cotton harvesters having on-board module forming structure, such as described in U.S. Pat. No. 6,032,446 entitled DENSIFICATION METHOD AND APPARATUS FOR HARVESTED COTTON OR OTHER SIMILAR FIBROUS MATERIAL, provide a compact bale or module directly on the harvester to reduce the amount of support equipment needed in the field and minimize harvester idle time during offloading. The on-board processing structure requires a robust bale handling system for moving a large formed bale rearwardly to prepare the bale chamber for a second bale with little or no harvester down time. A large accumulation area or similar structure for storing a substantial amount of harvested crop is also necessary to allow harvesting to continue while the bale is discharged from the bale forming chamber.

Another problem with previous systems with on-board processors is the forming and handling of the bale, which is relatively large and can weigh on the order o eight tons or more when completed. As the bale forms and the bale weight increases, the horsepower requirement to complete the bale forming process and to move the harvester through the field also increases. The bale handling system has to be very robust to move and support the heavy bale while harvesting. The large bale can also adversely raise the machine center of gravity, and the bale-forming chamber necessary for a large bale is problematic when trying to maintain a satisfactory harvester shipping and transport height. Handling the bales when unloaded from the harvester is difficult or impossible with conventional bale handling equipment.

BRIEF SUMMARY OF THE INVENTION

It is therefore an object of the present invention to provide an improved on-board cotton handling system that overcomes most or all of the aforementioned problems. It is a further object to provide such a system which reduces or eliminates harvester down time during unloading of the crop from the harvester without need for forming a very large, heavy bale. It is still another object to provide such a system with reduced power consumption and with lower center of gravity and lower-transport height than a system with a single large bale forming chamber.

It is a further object of the present invention to provide an improved cotton handling system for a cotton harvester which facilitates on-board processing of the cotton. It is another object of the present invention to provide such a system having a relatively simple on-the-go bale forming and discharge system. It is still another object to provide such a system which can utilize balers similar or identical in construction to commercially available round balers. It is a further object to provide such a system which facilitates use of conventional bale handling equipment to move formed bales.

It is another object of the invention to provide an on-board baling system for a cotton harvester which utilizes side-by-side baling devices It is another object to provide such a baling system having a single accumulator with cotton control structure for selectively directing cotton to one of the baling devices while the other device is unloading a bale. It is a further object to provide such a device which does not require complicated and expensive lateral shifting mechanisms to direct cotton to the selected baling device and which prevents bridging and breaks up clumps of material in the storage area for better cotton feeding.

In accordance with the above objects, an on-board cotton harvester baling system includes first and second balers mounted side-by-side on the frame of a cotton harvester adjacent a single accumulator that extends generally the width of the balers. One of two sets of metering rollers located at the bottom of the accumulator is selectively activated to feed cotton to either the first baler or the second baler- An reversible auger extending the width of the accumulator moves cotton within the accumulator towards the activated set of metering rolls to assure a continued supply of material for the operating baler. When the bale is fully formed in the active baler, the opposite set of metering rolls and the other baler are activated, and the auger is reversed.

Reduced bale size makes bale handling easier and reduces power consumption. Overall implement height is lowered and center of gravity is reduced compared to systems which form a single large bale. Excellent harvester productivity with substantially continuous harvesting is facilitated despite the smaller bale size since one chamber can be discharging on-the-go while the other chamber is forming a bale. The single accumulator with reversing auger provides simple directing of cotton to desired baler without need for complicated, expensive input shifting mechanisms.

These and other objects, features and advantages of the present invention will become apparent to one skilled in the art upon reading the following detailed description in view of the drawings.

DESCRIPTION OF THE DRAWINGS

FIG. 3 is an enlarged side view of the lower portion of one side of the accumulator system showing the drive for the accumulator metering floor rolls.

DETAILED DESCRIPTION OF THE DRAWINGS

Figure 1:
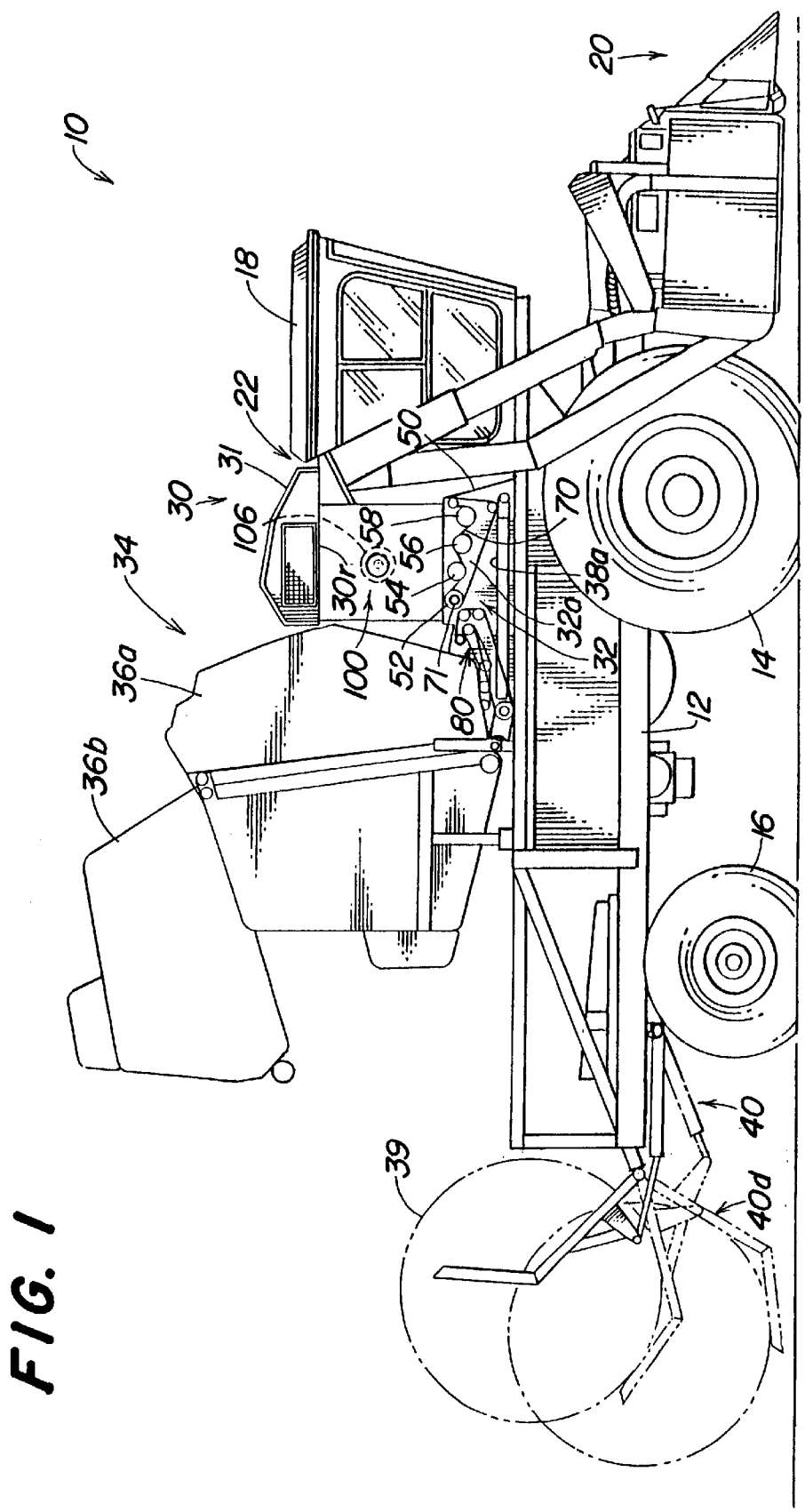
FIG. 1 is a side view of a cotton harvester having an accumulator system mounted on the harvester frame forwardly of an on-board processor including two round balers.

Referring now to FIG. 1 therein is shown a cotton harvester 10 having a main frame 12 supported for movement by forward drive wheels 14 and rear steerable wheels 16. An operator station or cab 18 is supported at the front end of the main frame 12 above forwardly mounted harvesting structure indicated generally at 20 which removes cotton from plants and directs the removed cotton into an air duct system 22.

An upright storage or accumulator system 30 with an upper inlet structure 31 and metering floor structure 32 having transversely spaced metering outlets 32a and 32b is supported on the frame 12 behind the cab 18 for receiving the cotton from the air duct system 22. An on-board processor 34 includes first and second module builders or balers 36a and 36b supported in side-by-side relationship rearwardly of the accumulator system 30. The balers 36a and 36b are preferably standard round balers having a clam-shell construction which is opened to discharge a bale. The right-hand baler 36a (as viewed in the forward direction of travel) is fed by a conveyor system 38a extending under the metering floor structure outlet 32a, and the left-hand baler 36b is fed by a similar conveyor system 38b extending under the opposite metering floor structure outlet 32b.

The accumulator system 30 stores cotton as necessary, and the selected one of the metering floor structure outlets 32a and 32b uniformly distributes the cotton to the corresponding operating baler 36a or 36b via conveyor 38a or 38b to form a module or round bale 39. A bale handling system 40 is located rearwardly of the balers 36a and 36b for receiving the formed bale 39. The system 40 temporarily supports the formed bale 39 and then discharges it from the harvester 10 at a location in the field convenient for pick up.

The metering floor structure 32 includes a support frame 50 connected to the lower end of the accumulator system 30 and rotatably mounting two transversely spaced sets of drive sprocket driven metering rolls 52, 54 and 56, 58 (only the rolls for the right-hand outlet 32a are shown) generally in a plane which, as best seen in FIGS. 1 and 3, angles upwardly with respect to the conveyor 38a in a downstream direction, that is, towards the processing structure 34. As shown in FIGS. 1 and 3, the conveyor 38a extends generally horizontally under the metering floor structure 32a behind the harvester cab 18. The rear rolls 52 and 54 are offset above the conveyor 56 a sufficient distance to provide clearance for metering cotton onto the cotton already deposited on the conveyor 56 from the front rolls 56 and 58. Drive sprockets 62, 64 and 66, 68 are fixed to an end of each of the rolls 52, 54 and 56, 58 and are driven by a chain 70 (FIG. 3) to provide counter-rotation of adjacent rolls to draw cotton downwardly between the rolls 52 and 54 and between the rolls 56 and 58. A conventional drive, such as a hydraulic motor 72a, selectively provides power to the sprockets through the chain 70. The left-hand metering rolls for the outlet 32b located above the conveyor are generally identical in construction, drive and operation to those described directly above for the outlet 32a and are driven by a separate hydraulic motor so the outlets 32a and 32b can be individually controlled by the operator. The conveyors 38a and 38b can each be driven with the same hydraulic motor that powers the rolls 52–58 for that side.

Short projections 76 (FIG. 3) spaced laterally on each of the rolls 52–58 help to pull cotton downwardly between each roll pair 52, 54 and 56, 58 when driven by the chain 70. The projections on one roll are timed so that they are 90 degrees out of phase with the projections on the adjacent roll to help reduce clumping and reduce torque peaks. When a set of the rolls 52–58 remain undriven, the rolls act as a floor to prevent egress of the cotton from the accumulator system 30 onto the corresponding conveyor 38a or 38b. Therefore, a selected one of the balers 36a and 36b can be fed with cotton material by activating the hydraulic motor for the corresponding one of the floor structures 32a and 32b. Mat forming belt structure 80 (FIG. 1) generally as described in the aforementioned U.S. Pat. No. 6,032,446 may be provided at the infeed area of the balers 36a and 36b which cooperates with the conveyors 38a and 38b to form a tight, compressed mat which is then rolled into a compact round bale in the corresponding bale forming chambers of the balers.

By way of example, when a bale 39 is completed in the chamber of the left-hand baler 36b (FIG. 1), the operator stops drive to the corresponding floor structure 32b and conveyor 38b by removing hydraulic drive to the motor through a conventional hydraulic control (not shown) located in the cab 18 so the rolls 52–58 block egress from the accumulator system 30 above the conveyor 38b. At the same time, the baler 36a is activated, and the drive to the floor structure 32a and conveyor 38a is engaged by activating the motor 72a so that cotton material is distributed onto the conveyor 38a for delivery to the belt structure 80 at the infeed area of the right-hand baler 36a While the baler 36a is forming a second bale, the discharge cycle for the first bale 39 can be completed without interruption of harvesting. The bale 39, as best seen in FIG. 1, may be discharged immediately after forming by opening the clam-shell of the baler 36b and then supported from the harvester frame 12 by the bale handling system 40. Alternatively, the bale 39 may be maintained within the bale forming chamber of the baler 36b until the harvester reaches the desired location in the field for discharging the bale. , Once discharged from the baler, the system 40 can be activated (40d of FIG. 1) to discharge the bale completely from the harvester 10. A substantially identical procedure is initiated for the opposite side once a second bale is completed in the baler 36a for generally continuous harvesting.

Figure 2:
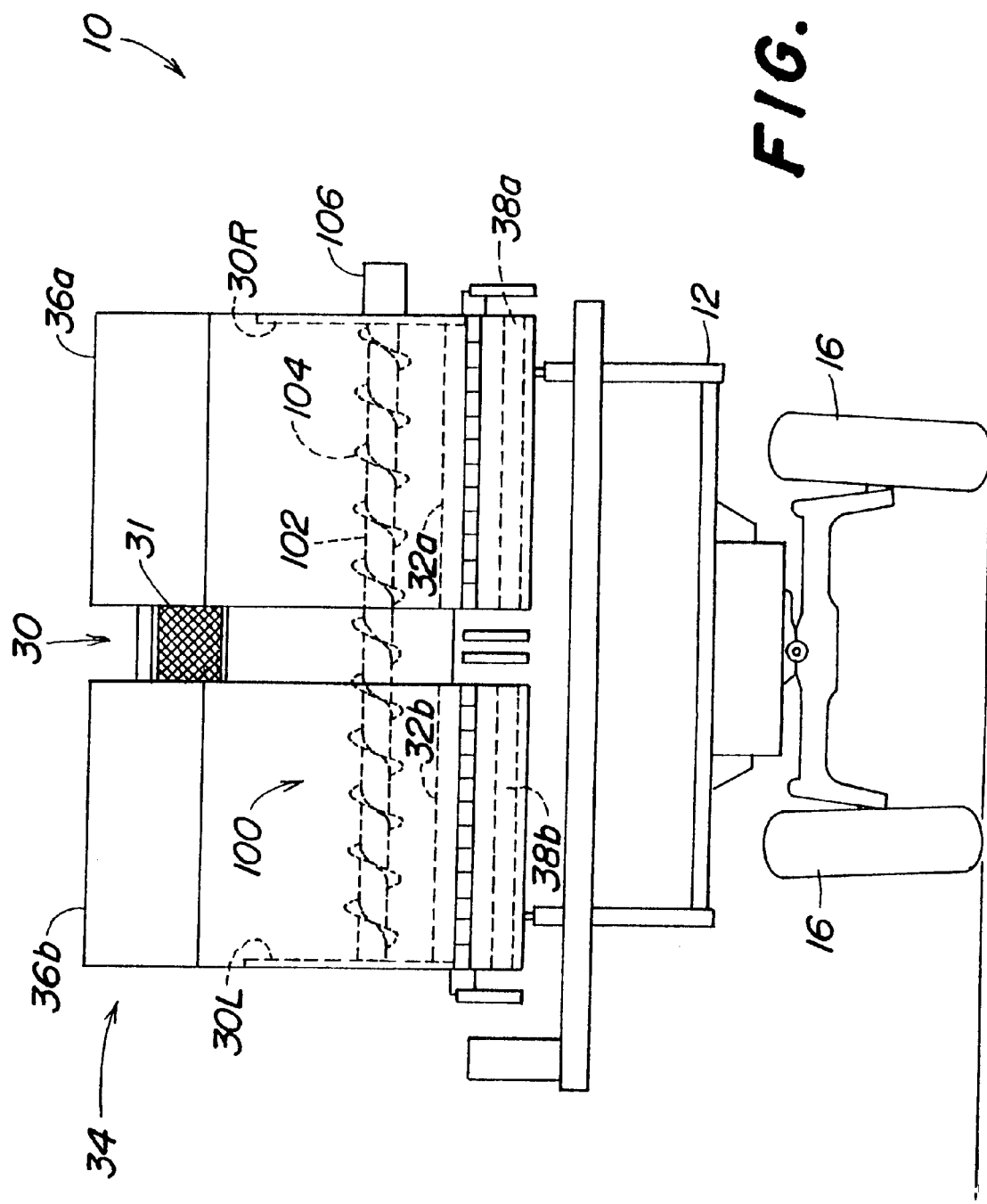
FIG. 2 is a rear view of the harvester of FIG. 1 with parts removed to better show the accumulator system with reversible auger and the dual baler arrangement.

To provide improved feeding of cotton material from the accumulator system 30, a distribution system indicated generally at 100 in FIGS. 1 and 2 is provided within the accumulator system 30 to move cotton towards the activated one of the metering floor structures 32a and 32b. The distribution system 100 as shown includes an auger 102 with flighting 104 extending substantially the width of the accumulator system 30 between outer walls 30L and 30R at a central location above the metering floor structures 32a and 32b. A reversible hydraulic motor 106 selectively powers the auger 102 for rotation in the direction that moves the cotton material in the accumulator system 30 towards the activated floor structure. For example, when the right-hand metering outlet 32a and conveyor 38a are activated, the motor 106 is driven in the counter-clockwise direction as viewed in FIG. 1 so the flighting 104 (FIG. 2) directs the material towards the right. When the left-hand metering outlet 32b and conveyor 38b are activated, the motor is reversed to direct cotton towards the left. The distribution system 100 helps assure a uniform supply of cotton to the activated side. The auger 102 also helps break up clumps of cotton and prevents bridging of material for better feeding of cotton downwardly towards the outlets.

Having described the preferred embodiment, it will become apparent that various modifications can be made without departing from the scope of the invention as defined in the accompanying claims.

We claim:

1. In a cotton harvester movable forwardly over a field of cotton plants for removing cotton from the plants, the harvester including duct structure conveying removed cotton, baling structure comprising:

a storage area located downstream of the duct structure on the harvester and receiving the cotton removed from the plants, the storage area including first and second selectively activatable discharge areas;

first and second selectively operable balers supported on the harvester and including first and second infeed areas opening towards the first and second discharge areas, respectively, and bale forming chambers; and discharge control structure activating the first discharge area when the first baler is operating to direct cotton to the first baler to form a first bale and activating the second discharge area to direct cotton to the second baler when the second baler is operating, the storage area on the harvester and the discharge control structure thereby facilitating continuous harvesting of the cotton plants as the first bale is fully formed.

2. The cotton harvester as set forth in claim 1 wherein the storage area includes a distribution system extending between the first and second discharge areas and moving the received cotton towards the activated discharge area.

3. The cotton harvester as set forth in claim 1 wherein the bailers are supported on the harvester in side-by-side relationship offset from the storage area, and conveyor structure extending between the discharge areas and the infeed areas for delivering cotton from the first discharge area to the first infeed area and from the second discharge area to the second infeed area.

4. The cotton harvester as set forth in claim 1 wherein the discharge areas comprise rotatable metering rolls.

5. The cotton harvester as set forth in claim 4 wherein the discharge control structure includes a motor drive connected to the metering rolls for rotating the rolls, and wherein the rolls, when non-rotating, form a barrier to egress of the removed cotton from the storage area.

6. the cotton harvester as set forth in claim 1 further comprising bale support structure located adjacent the balers for receiving and supporting a formed bale from the harvester, the support structure receiving the formed bale from the first baler while the second baler is selected for operation to thereby provide generally uninterrupted harvesting during bale handling operations.

7. In a cotton harvester for removing cotton from plants including duct structure conveying removed cotton, baling structure comprising:

a storage area located downstream of the duct structure and receiving the cotton removed from the plants, the storage area including first and second selectively activatable discharge areas;

first and second selectively operable balers supported on the harvester and including first and second infeed areas opening towards the first and second discharge areas, respectively, and bale forming chambers;

discharge control structure activating the first discharge area when the first baler is operating to form a first bale and activating the second discharge area when the second baler is operating;

wherein the storage area includes a distribution system extending between the first and second discharge areas and moving the received cotton towards the activated discharge area; and wherein the distribution system comprises an auger, and a reversible drive connected to the auger and rotating the auger in a first direction when the first discharge area is activated and in a second direction opposite the first direction when the second discharge area is activated.

8. In a cotton harvester for removing cotton from plants including duct structure conveying removed cotton, baling structure comprising:

a storage area located downstream of the duct structure and receiving the cotton removed from the plants, the storage area including first and second selectively activatable discharge areas;

first and second selectively operable balers supported on the harvester and including first and second infeed areas opening towards the first and second discharge areas, respectively, and bale forming chambers;

discharge control structure activating the first discharge area when the first baler is operating to form a first bale and activating the second discharge area when the second baler is operating;

wherein the discharge areas comprise rotatable metering rolls; and an auger supported for rotation above the discharge areas for directing cotton towards the discharge area which is selectively activated.

9. The cotton harvester as set forth in claim 8 wherein the auger comprises a reversible auger for rotation in a first direction when the first discharge area is activated and in a second direction opposite the first direction when the second discharge area is activated.

10. In a cotton harvester having a frame adapted for forward movement over a field of cotton plants for removing cotton from the plants, the harvester including duct structure conveying removed cotton, baling structure comprising:

an upright storage area located on the frame rearwardly of the duct structure and extending transversely to the forward direction, the storage area having an input area receiving the removed cotton from the duct structure and a discharge area;

first and second selectively operable baling chambers supported side-by-side on the harvester frame and including first and second forwardly opening infeed areas, the baling chambers selectively activatable to bale cotton from the storage area and form individual bales in the chambers; and wherein the discharge area includes selectively activatable first and second outlets to move cotton from the storage area to the first and second baling chambers, respectively, the outlets activatable to direct the cotton from the storage area to the second baling chamber when a bale is completed in the first chamber to facilitate continuous cotton harvesting without need to stop the harvester when the bale in the first chamber is completed.

11. The cotton harvester as set forth in claim 10 wherein the first and second outlets comprise metering rolls having a driven condition for moving cotton from a lower portion of the storage area and a non-driven condition for preventing egress of the cotton from the lower portion.

12. The cotton harvester as set forth in claim 10 including bale discharge structure for receiving a bale from the first baling chamber while the second baling chamber is activated and forming a bale.

13. The cotton harvester as set forth in claim 10 wherein the first and second outlets are offset transversely from each other, and further comprising first and second conveyors extending from the first and second outlets to the first and second infeed areas, respectively.

14. The cotton harvester as set forth in claim 13 including drive structure powering the first conveyor and first outlet when the first chamber is activated.

15. In a cotton harvester having a frame adapted for forward movement over a field of cotton plants for removing cotton from the plants, the harvester including duct structure conveying removed cotton, baling structure comprising:

an upright storage area located rearwardly of the duct structure and extending transversely to the forward direction, the storage area having an input area receiving the removed cotton from the duct structure and a discharge area;

first and second selectively operable baling chambers supported side-by-side on the harvester frame and including first and second forwardly opening infeed areas, the baling chambers selectively activatable to bale cotton from the storage area and form individual bales in the chambers;

wherein the discharge area includes selectively activatable first and second outlets to move cotton from the storage area to the first and second baling chambers, respectively; and including a reversible auger and a drive rotating the auger in a first direction when the first outlet is activated to move cotton towards the first outlet, and in a second direction when the second outlet is activated to move cotton towards the second outlet.

16. In a cotton harvester having a frame adapted for forward movement over a field of cotton plants for removing cotton from the plants, the harvester including duct structure conveying removed cotton, baling structure comprising:

an upright storage area located rearwardly of the duct structure and extending transversely to the forward direction, the storage area having an input area receiving the removed cotton from the duct structure and a discharge area;

first and second selectively operable baling chambers supported side-by-side on the harvester frame and including first and second forwardly opening infeed areas, the baling chambers selectively activatable to bale cotton from the storage area and form individual bales in the chambers;

wherein the discharge area includes selectively activatable first and second outlets to move cotton from the storage area to the first and second baling chambers, respectively;

wherein the first and second outlets are offset transversely from each other, and further comprising first and second conveyors extending from the first and second outlets to the first and second infeed areas, respectively; and wherein the first and second outlets comprise first and second sets of meter rolls offset above the first and second conveyors, respectively.

17. In a cotton harvester having a frame adapted for forward movement over a field of cotton plants for removing cotton from the plants the harvester including duct structure conveying removed cotton, baling structure comprising:

a cotton receiving area located rearwardly of the duct structure on the frame, the cotton receiving area having an input receiving the removed cotton from the duct structure and a discharge area;

first and second baling chambers supported on the harvester frame, the baling chambers selectively activatable to bale cotton from the cotton receiving area and form individual bales in the chambers; and wherein the discharge area includes outlet structure facilitating movement of the cotton to the activated bale chamber while limiting movement of the cotton to the other bale chamber so the harvester can continue to remove cotton from the plants and convey the cotton through the duct structure when a completed bale is in the other bale chamber.

18. The cotton harvester as set forth in claim 17 wherein the cotton receiving area is fixed relative to the frame, and the discharge area includes first and second selectively activatable outlets feeding the first and second baling chambers, respectively.

19. In a cotton harvester having a frame adapted for forward movement over a field of cotton plants for removing cotton from the plants, the harvester including duct structure conveying removed cotton, baling structure comprising:

a cotton receiving area located rearwardly of the duct structure, the cotton receiving area having an input receiving the removed cotton from the duct structure and a discharge e area;

first and second baling chambers supported on the harvester frame, the baling chambers selectively activatable to bale cotton from the cotton receiving area and form individual bales in the chambers;

wherein the discharge area includes outlet structure facilitating movement of the cotton t o the activated bale chamber;

wherein the cotton receiving area is fixed relative to the frame, and the discharge area includes first and second selectively activatable outlets feeding the first and second baling chambers, respectively; and wherein the outlets are supported in side by side relationship and the cotton receiving area includes an auger extending horizontally between the input and the discharge area above the outlets, the auger rotating in a first direction to move cotton towards the first outlet when the first baling chamber is activated and in a second direction opposite the first direction to move cotton towards the second outlet when the second baling chamber is activated.

20. The cotton harvester as set forth in claim 19 wherein the first and second outlets include first and second sets, respectively, of rotating metering rolls, the sets of metering rolls supported in side by side relationship and extending parallel to the auger.

* * * * *